United States Patent [19]

Hamrick

[11] 3,819,872

[45] June 25, 1974

[54] MOBILE TELEPHONE CELLULAR SWITCHING SYSTEM

[75] Inventor: Harold Escar Hamrick, Columbus, Ohio

[73] Assignee: Bell Telephone Laboratories Incorporated, Murray Hill, N.J.

[22] Filed: July 10, 1972

[21] Appl. No.: 270,499

[52] U.S. Cl. .................... 179/41 A, 325/55, 325/64

[51] Int. Cl. ............................................ H04q 7/04

[58] Field of Search ........ 179/41 A; 325/52, 53, 54, 325/55

[56] References Cited

UNITED STATES PATENTS

| | | | |
|---|---|---|---|
| 2,737,578 | 3/1956 | Bartelink | 325/53 |
| 3,662,267 | 5/1972 | Reed | 325/55 |
| 3,663,762 | 5/1972 | Joel, Jr. | 179/41 A |

*Primary Examiner*—Kathleen H. Claffy
*Assistant Examiner*—Thomas L. Kundert
*Attorney, Agent, or Firm*—D. A. Marshall; F. W. Padden

[57] ABSTRACT

A high capacity cellular mobile communication system arranged to maintain a mobile station communication path by transferring the mobile station from a shadowed serving base station to a clear base station. A multiport trunk circuit is utilized to establish the communication path between a switching central office and the mobile station through a serving base station. The deterioration of the serving base station radio carrier communication link, brought about by the shadowing of the serving base station, enables the trunk circuit to test continuity of communication channels through other base stations to the mobile station. Once continuity of a new communication channel has been established through a clear base station, the trunk transfers the communication path to the tested communication channel in order that a continuous communication path may be maintained between the switching central office and the mobile station.

24 Claims, 8 Drawing Figures

MOBILE TELEPHONE CELLULAR SWITCHING SYSTEM

BACKGROUND OF THE INVENTION

1. Field of the Invention

This invention concerns mobile communication systems. In particular, it relates to high capacity cellular mobile communication systems wherein a communication path established to a mobile station may be continuously maintained as the mobile station moves in and between the transmission areas of cell base stations.

2. Description of the Prior Art

The literal mobility of communication stations having the ability to move from one location to another has presented problems in prior arrangements which have attempted to furnish adequate communication services to mobile station users. It has long been a goal of mobile communication systems to provide continuous communication service for roaming mobile stations. It has further been a goal to maintain continuity of communication service between mobile stations and between mobile stations and the telephone direct distance dialing network regardless of the geographical locations of mobile stations.

In the mobile communication service art it is the practice for mobile stations to be served by ones of a number of radio base stations which, in turn, are connected to a switching central office. Communication is effected between a base station and a mobile station by modulating radio carrier waves with intelligence signals. The service zone of a base station is, of course, limited to a certain geographical area, the boundaries of which depend upon the power of the carrier waves and upon the nature of the terrain about the base station.

Basically, the procedure for providing communication service to a mobile station is to assign one of a plurality of two-way radiant energy radio carrier links to a base station selected to serve the mobile station. A communication path is subsequently established between the mobile station and the switching central office over the assigned radio links of the base station. The switching central office, in turn, selectively connects the mobile station communication path to other communication paths associated with mobile stations and telephone stations of the nationwide telephone direct distance dialing network.

Prior art mobile communication systems, such as the cellular mobile communication system disclosed by A. E. Joel, Jr. In U.S. Pat. No. 3,663,762, issued May 16, 1972, are arranged to maintain continuity of communications with a mobile station experiencing difficulty in communicating through a serving base station. When this transmission problem occurs a new connection is established between the switching central office and the mobile station through another base station. Subsequently, a stored program control unit, common to the cellular mobile communication system directs the switching central office and the mobile station over the prior connection through the serving base station to transfer the communication path onto the new connection. Although the cellular mobile communication system disclosed by Joel is a substantial contribution to the technology, the communication path of a moving mobile station may be interrupted when the mobile station is directed to transfer onto transmitting and receiving radio carrier waves of another base station that is experiencing difficulty in communicating with the mobile station. Such a base station, may for example, be temporarily shadowed by an obstruction, such as a high building.

Accordingly, a need exists in the art for a mobile communication system capable of establishing a connection, hereinafter referred to as a channel, with a conversing mobile station through a base station and for transferring a communication path onto the channel when the continuity of the channel has been established with the mobile station through the base station. A need also exists for a mobile communication system capable of establishing other channels to the conversing mobile station through different base stations upon failure to establish continuity with the mobile station over a channel set up through a shadowed base station.

SUMMARY OF THE INVENTION

In the exemplary embodiment, communication trunk apparatus is provided for use with a cellular mobile communication system comprising a switching central office, a common stored program control unit, and a plurality of base stations defining cell transmission areas. The communication system is arranged so that the common stored program control unit controls the establishment of a mobile station communication path by directing a cell controller to couple the switching central office with a base station communication channel extending from the trunk apparatus through a base station serving the mobile station. The communication system is further arranged so that detection of the adverse quality of communications occurring over the mobile station communication path enables the trunk apparatus to test for transmission continuity with the mobile station through additional base station communication channels of other base stations capable of serving the mobile station. Once the continuity of another base station communication channel is established with the mobile station the trunk apparatus rearranges the coupling of the switching central office with the other base station communication channel in order that an uninterrupted communication path may be maintained between the switching central office and the mobile station.

In accordance with one feature of my invention the trunk apparatus is arranged to establish and maintain a communication path between a switching central office and a mobile station. This is accomplished by selectively coupling, under the direction of a cell controller, a switching central office communication channel with ones of a plurality of base station communication channels priorly defined as having continuity of mobile station transmission extending through a base station serving the mobile station.

Another feature of my invention is the provision of means incorporated within the trunk apparatus for testing transmission continuity of base station communication channels extending to the conversing mobile station through other base stations priorly determined capable of serving the mobile station.

In accordance with another feature of my invention, the trunk apparatus maintains an uninterrupted communications path between a conversing mobile station and the switching central office by rearranging the coupling of the switching office channel with a base station communication channel having priorly established continuity of signal transmission with the conversing mobile station.

In accordance with still another feature of my invention, the trunk apparatus is arranged to notify a cell controller that transmission continuity has or has not been established with a conversing mobile station within a predetermined interval of time. The present trunk apparatus is also arranged to indicate an interruption of a connection established between a first port coupled with a switching central office and one of a plurality of second ports coupled with a conversing mobile station.

DESCRIPTION OF THE DRAWING

The foregoing objects and advantages, as well as others of the invention, will be more apparent from the following detailed description, together with the drawing, in which.

Figure 4A:
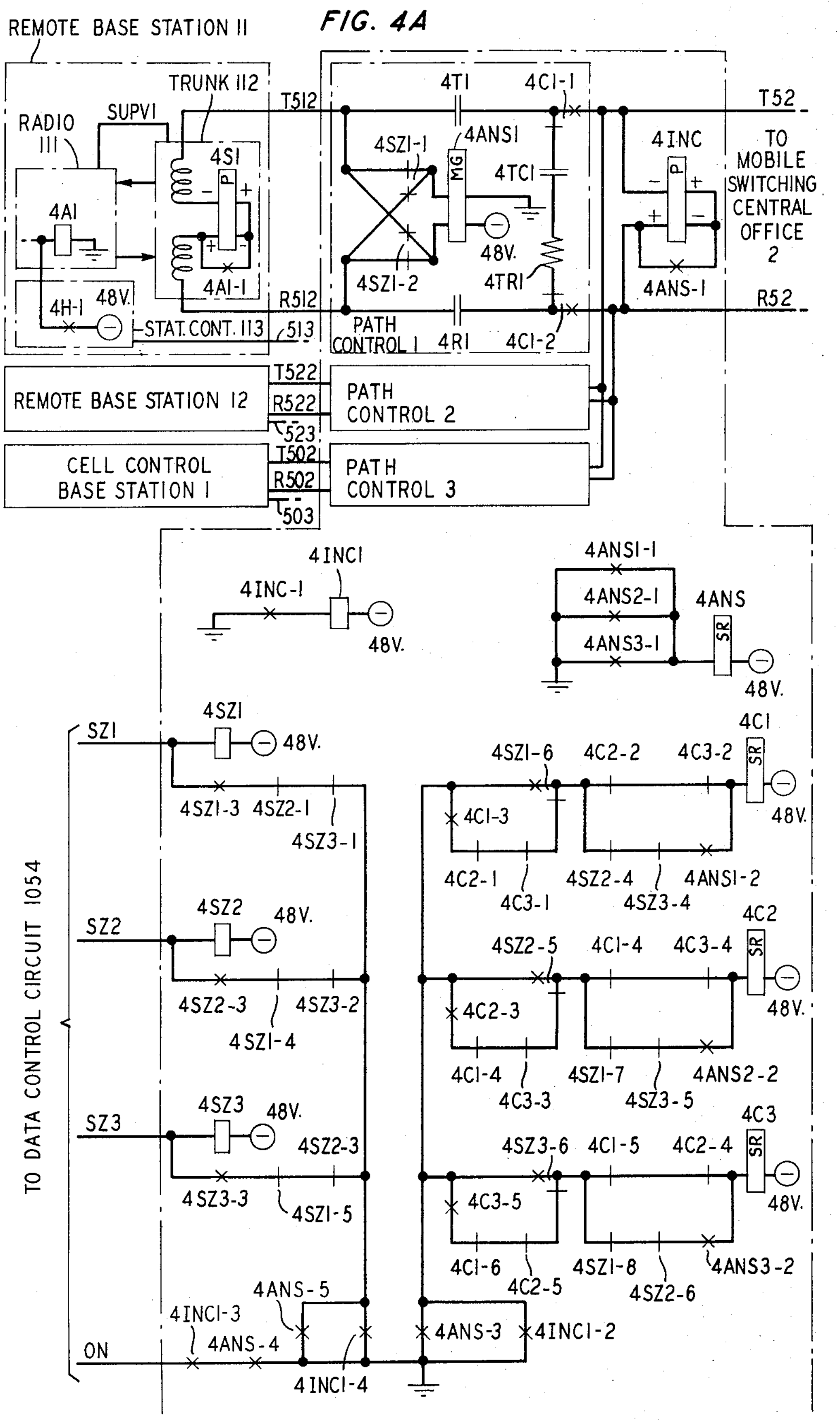
FIGS. 4A and 4B, when arranged in accordance with FIG. 4C, set forth a schematic representation of the communications trunk circuit embodying the principles of my invention.
Figures 4B, 4C:
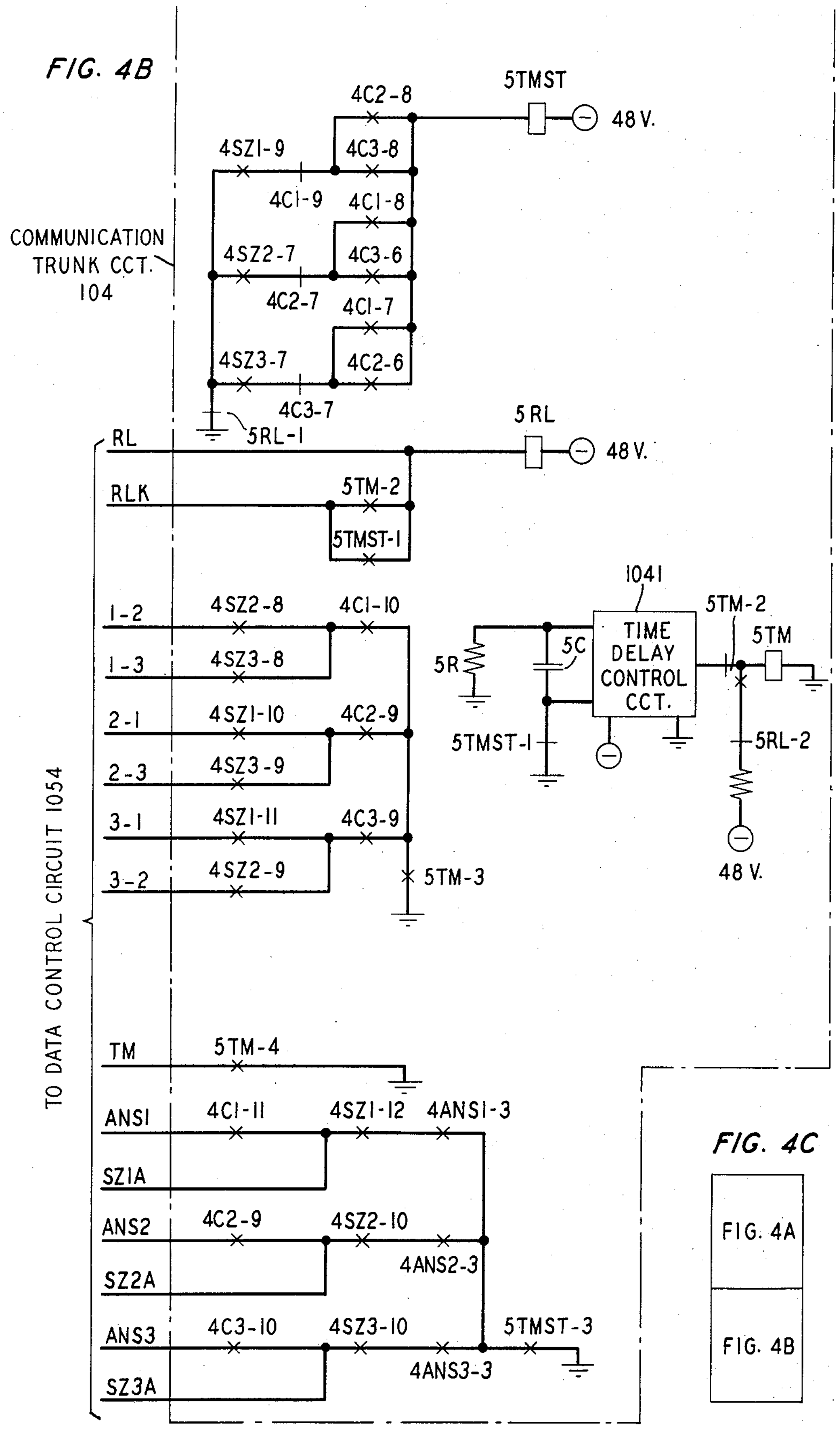

It will be noted that FIGS. 4A and 4B of the drawing employ a type of notation referred to as "detached contacts" in which an "X", shown intersecting a conductor, represents a normally open "make" contact of a relay, and a "bar", shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer in the September, 1955, publication of *American Institute of Electrical Engineers Transactions, Communications and Electronics*, Volume 74, pages 505–513.

I. GENERAL DESCRIPTION

A. System Operation

Figure 1:
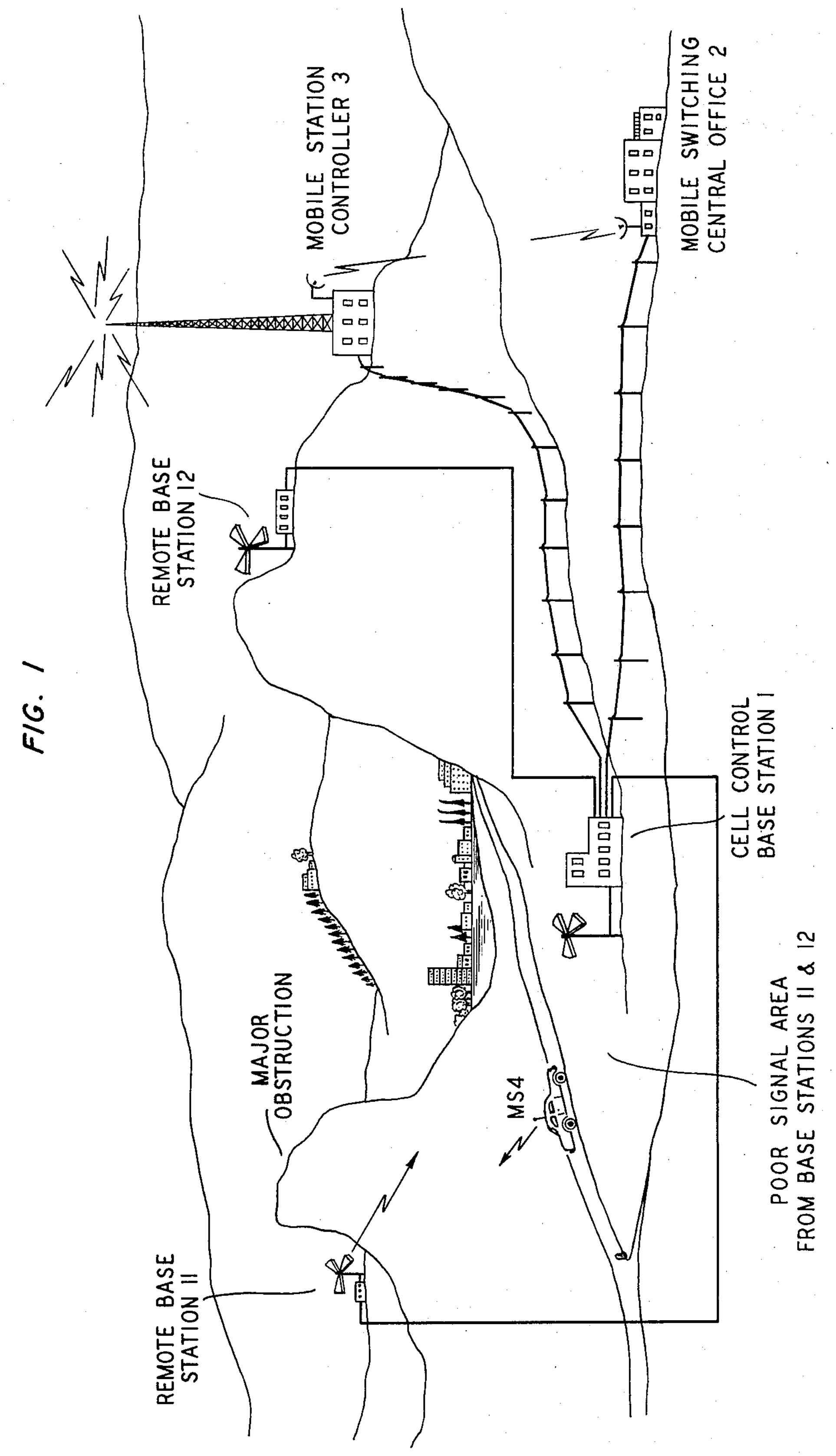
FIG. 1 illustrates a high capacity cellular mobile communication system to which the present invention may be advantageously applied.

Referring now to FIG. 1 of the drawing, it is intended that any given geographical area be subdivided into a number of smaller radio coverage areas herein referred to as cell transmission areas. It is further intended that each cell transmission area be provided radio service from a plurality of base stations designated as cell control base station 1 and remote base stations 11 and 12. Each cell control and remote base station is assigned a two-way radio carrier data link and a plurality of two-way radio carrier communication links for the purpose of establishing communication with mobile stations, such as mobile station MS4 located within the cell transmission area. The radio carrier links are transmitted and received by directional antenna structures associated with each base station.

Cell control base station 1, in addition to providing the aforementioned radio service, is also arranged to assimilate location information, process service requests, and establish communication paths for mobile stations located within the serviced cell transmission area. Remote base stations 11 and 12 are interconnected to cell control base station 1 in order that control data may be exchanged between base stations and that communication paths may be established through a serving base station with mobile stations.

Cell control base station 1 is connected by data links to mobile station controller 3 and by communication channels, commonly referred to as land lines, to mobile switching central office 2. Mobile station controller 3 basically comprises a stored program electronic data processor for the purpose of processing service requests, assigning radio carrier links and communication channels, and assimilating location information for mobile stations moving in and between cell transmission areas. Mobile switching central office 2 may be of a type designed to exclusively serve mobile stations or, as in the present embodiment, may be a conventional type telephone switching central office utilized to provide a common switching service for mobile stations in addition to telephone stations of the telephone direct distance dialing network.

Figures 2A, 2C:
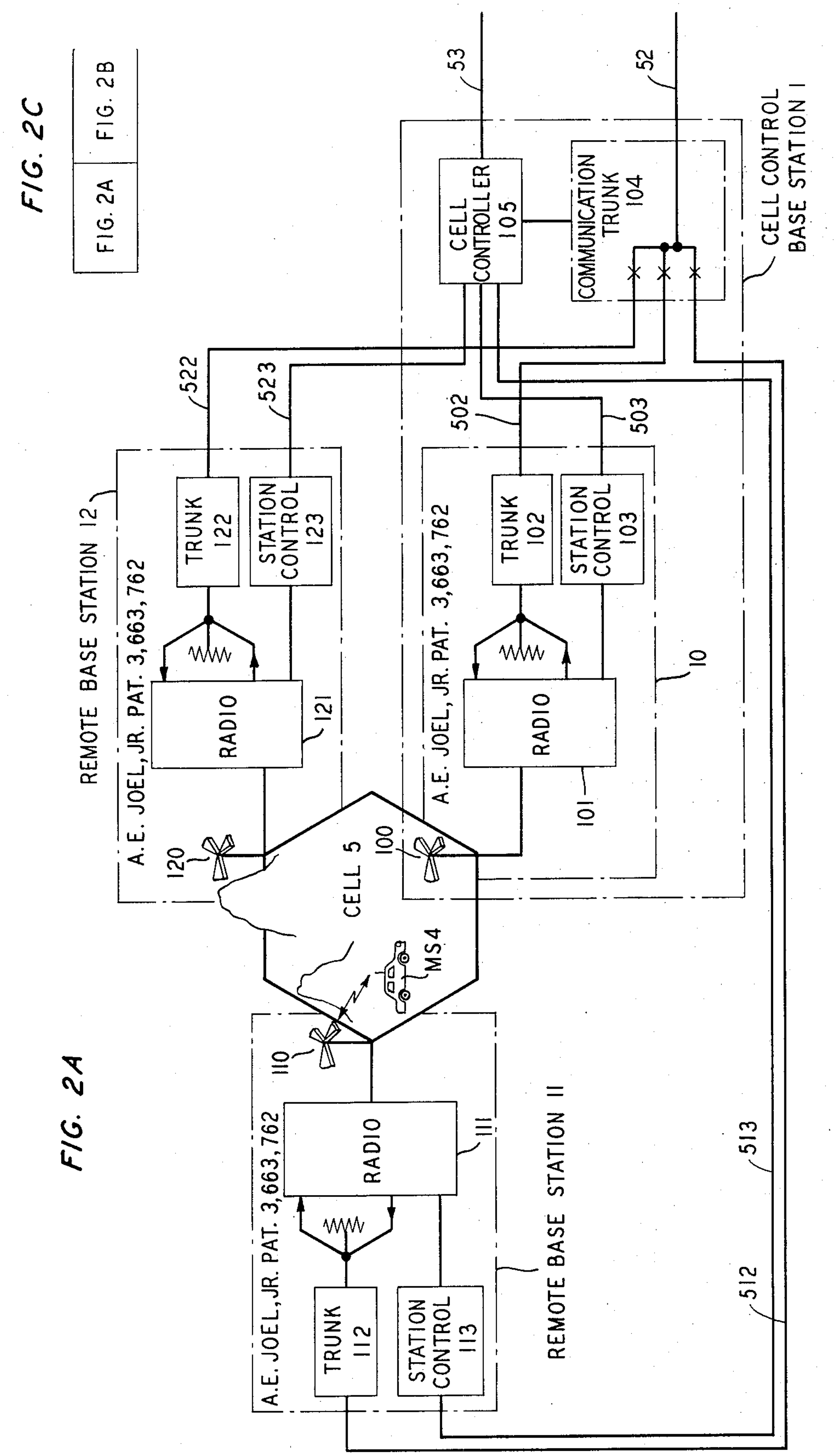
FIGS. 2A and 2B, when arranged in accordance with FIG. 2C, set forth the interrelationship of the various components comprising the cellular mobile communication system of FIG. 1.

Referring now to FIG. 2A of the drawing, it is intended that a cell transmission area be represented as a hexagonal area designated cell 5. It is further intended that cell control base station 1 and remote base stations 11 and 12 be individually, as shown, located at opposite corners of hexagonal cell 5. It is also intended, FIGS. 2A and 2B, that mobile switching central office 2, mobile station controller 3, remote base stations 11, 12, and the base station components 10 of cell control base station 1 represent part of the mobile communication system disclosed in the aforementioned patent by A. E. Joel, Jr. The present invention is not limited to use with a mobile communication system of the type described by Joel but may be advantageously utilized with other types of switching systems.

B. Request for Service

A mobile station, such as mobile station MS4 located in cell 5, originates a service request by seizing the strongest two-way radio carrier data link generated by the directional antenna of a nearby cell control or remote base station. Assuming that mobile station MS4 has seized the radio data link assigned to remote base station 11, radio apparatus 111 directs station control 113 to transmit information over data link 513 to cell controller 105 identifying the directional antenna 110 receiving the strongest signal. Radio apparatus 121 and 101 of remote and cell control base stations 12 and 1, respectively, receive the mobile station MS4 seizure signal and transmit additional signal strength information over data links 523 and 503 to cell controller 105.

The cell controller 105 of cell control base station 1 processes the received information and determines if calling mobile station MS4 is located within cell 5. When calling mobile station MS4 is located within cell 5, cell controller 105 selects a base station capable of serving the mobile station requesting service and transmits a request for assignment information over data link 53 to mobile station controller 3, FIG. 2B. In the event the received information indicates that the calling mobile station is located in an adjacent cell, cell controller 105 transmits location information over data link 53 for enabling mobile station controller 3 to compute the mobile station cell location.

Mobile station controller 3, in the manner described in detail by the aforementioned Joel patent, records the received assignment request information in cell function translator 33 and initiates a service request, via peripheral translator 31, for stored program control system 30. Assuming that cell controller 105 has selected remote base station 11, stored program control system 30 selects a radio carrier communication link for use at remote base station 11 and one of a number of communication channels 52 extending between cell control base station 1 and mobile switching central office 2. The assignment information, comprising radio carrier communication link and communication channel, is then transmitted by peripheral translator 31 and cell function translator 33 over data link 53 to cell control base station 1, FIG. 2A. In addition, the communication channel 52 assignment information is also transmitted to mobile switching central office 2, FIG. 2B, through MSCO function translator 34 and data link 3428.

Cell controller 105, FIG. 2A, retransmits the radio carrier communication link assignment information over data link 513 to remote base station 11. Station control 113, in the manner described in the aforementioned patent by Joel, utilizes the received assignment information to establish a two-way radio carrier communication link between mobile station MS4 and selected radio equipment 111 through directional antenna 110. A base station communication channel is then continued from radio equipment 111 over trunk 112 and communication link 512 to communication trunk 104 of cell control base station 1.

Cell controller 105, in addition to retransmitting assignment information to serving remote base station 11, retains the communication channel assignment information for the purpose of directing communication trunk 104 to couple communication link 512 with communication channel 52. Thus, a communication path is thereby established between mobile switching central office 2 and mobile station MS4. Dial tone is returned from mobile switching central office 2 over the communication path to calling mobile station MS4 for the purpose of notifying the mobile station user that he may commence dialing the directory number identifying the telephone or mobile station for which the call is to be directed.

Figure 2B:
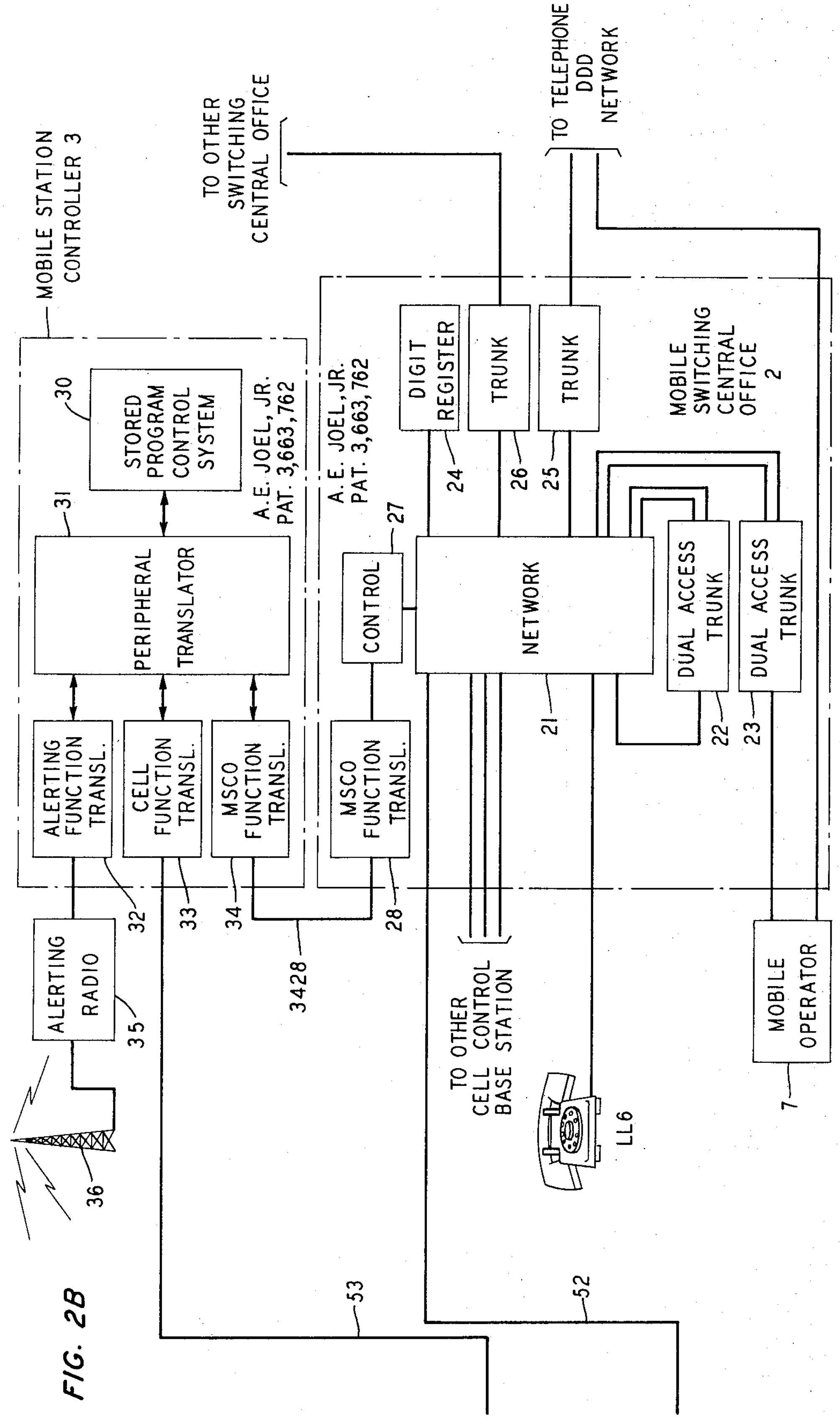

On an incoming call to a mobile station, for example, mobile station MS4, the called directory number is received by mobile switching central office 2, FIG. 2B, and and transmitted over data link 3428 to mobile station controller 3. Stored program control system 30 retransmits the called directory number, via alerting function translator 32, alerting radio equipment 35, and antenna 36, to all mobile stations located within the geographical area served by mobile station controller 3. Upon receiving the assigned directory number, called mobile station MS4 answers by seizing the strongest two-way radio carrier data link generated by a nearby cell control or remote base station. In a similar manner, as previously set forth for an originating call, called mobile station MS4 is located and a communication path is established between mobile switching central office 2 and mobile station MS4, FIG. 2A, via communication channel 52, communication trunk 104, communication link 512, and remote base station 11.

C. Intracell Handoff

Referring again to FIG. 1 of the drawing, it is assumed that mobile station MS4 is being served by a two-way radio carrier communication link transmitted and received by the directional antenna of remote base station 11. As mobile station MS4 moves within the transmission area of cell 5, the probability exists that the communication path of the mobile station may be subjected to the adverse effect of shadowing by a major obstruction, such as a high hill or building. As the mobile station moves into the shadowed or poor signal area, the quality of communications deteriorates until the communication path established through serving remote base station 11 becomes unusable.

In order to maintain continuous communications over the mobile station communication path, a new base station communication channel is established from cell control base station 1 through another base station, such as remote base station 12. The new base station communication channel is tested, in a manner hereinafter described in detail, for continuity through remote base station 12 with conversing mobile station MS4. When continuity has been established through remote base station 12 with mobile station MS4, mobile switching central office 2 is coupled to the tested base station communication channel for the purpose of maintaining a continuous mobile station communication path. In the event that continuity cannot be established with mobile station MS4 through remote base station 12, another base station communication channel is provided through a different base station, such as cell control base station 1. Following the establishment of continuity of a base station communication channel with mobile station MS4, mobile switching central office 2 is coupled to the tested base station communication channel in order that the mobile station communication path may be continued through cell control base station 1 to mobile station MS4. Thus, the rearrangement of the coupling of mobile switching central office 2 with base station communication channels is accomplished only after continuity of the base station communication channel has been established with a mobile station through the base station.

Cell controller 105, FIG. 2A, periodically interrogates base station controls 103, 113, and 123 to determine the quality of communications over the communication path priorly established through remote base station 11 with mobile station MS4. The cell controller 105 detects deterioraton of the communication path, brought about by the movement of mobile station MS4 into the poor signal area of remote base station 11, and maintains a continuous communication path by rearranging the coupling of communication channel 52 with a base station communication channel extending through another base station, such as remote base station 12. Control information is transmitted by cell controller 105 over data link 523 to remote base station 12. The control information received by station control 123 enables the establishment of a base station communication channel extending from directional antenna 120 through radio 121, trunk 122, and communication link 522 to communication trunk 104.

Communication trunk 104 is directed by cell controller 105 to test for the presence of continuity extending over communication link 522 through remote base station 12 and directional antenna 120 to mobile station MS4. Once continuity has been confirmed, communication trunk 104 rearranges the coupling of communication link 52 with communication link 522 for the purpose of maintaining the continuous communication path between mobile station MS4 and mobile switching central office 2.

Since mobile station MS4 is moving into the poor signal area of remote base station 12, it will be assumed in the present discussion that communication trunk 104 cannot establish a continuous base station communication channel with mobile station MS4 through remote base station 12. Communication trunk 104 then informs cell controller 105 which, in turn, transmits control information over data link 503 to establish another base station communication channel from directional antenna 100 through radio 101, trunk 102, and communication link 502 to communication trunk 104. When continuity has been established with mobile station MS4 over this base station communication channel, communication trunk 104 rearranges the coupling of communication link 52 with communication link 502 to maintain a continuous communication path between mobile station MS4 and mobile switching central office 2.

II. DETAILED DESCRIPTION

A. Cell Controller

As was described hereinbefore, cell control base station 1 functions principally to regulate and control call services for mobile stations located within cell 5. In performance of this function, cell control base station 1 includes, in addition to base station radio, trunk, and control equipment, cell controller 105 and a plurality of communication trunks 104. Cell controller 105, set forth in FIG. 3 of the drawing, basically comprises a word-organized electronic data processor, hereinafter referred to as data and voice trunk control circuit 1057. Many well-known general purpose computers can execute the functions performed by data and voice trunk control circuit 1057, therefore, a detailed description need not be given for a full understanding of my invention. Instead, certain parameters will be described generally to give an appreciation of how a typical data processor would be employed for utilization of the invention. It is to be understood, however, that my invention is not limited for use with the data processor being described and that other data processors can be employed in cell control base station 1 without departing from the spirit and scope of my invention.

Data and voice trunk control 1057 can be divided functionally into access circuit 10573, relocating store 10575, relocating data comparator 10576, relocating scanner control 10574, voice channel supervision control 10572, and access channel data comparator 10571. During the initial locating sequence information received by the directional antenna of each base station is received by access circuit 10573 and applied to access channel data comparator 10571. Access data comparator 10571 compares the information received from the base stations and selects the cell control or remote base station that will most advantageously serve a particular mobile station. Access circuit 10573 receives the identity of the selected base station, for example, remote base station 11, records the identity in relocating store 10575, and prepares an assignment request for transmission to mobile station controller 3.

Assignment information received from mobile station controller 3 is recorded by access circuit 10573 and transmitted to voice channel supervision control 10572. Voice channel supervision control 10572 employs the assignment information to generate and transmit, via access circuit 10573 and data control circuit 1054, control information to selected communication trunk 104. The control information enables communication trunk 104, in a manner hereinafter described, to initiate a sequence for establishing a communication path between mobile station MS4 and mobile switching central office 2.

After a mobile station communication path has been established, relocating scanner control 10574 generates and transmits, via access circuit 10573, scanner instructions to remote base stations 11, 12, and the base station equipment of cell control base station 1, FIG. 2A. Station control 103, 113, and 123, in the manner described in detail by the aforementioned Joel patent, directs the interrogation of the priorly established mobile station communication path and transmits results relating to the quality of communications over the mobile station communications path to cell controller 105. Access circuit 10573, FIG. 3, upon receipt of the interrogation results, transmits the received results to relocating data comparator 10576 which, in turn, compares them with information recorded in relocating store 10575 identifying the original serving remote base station 11.

When the interrogation results received by relocating data comparator 10576 match the information recorded in relocating store 10575, no further action is taken and remote base station 11 continues to serve mobile station MS4. In the event the match comparison detects that deterioration of the mobile station communication path has occurred, relocating data comparator 10576 selects another base station to serve the mobile station and records the identity thereof in relocating store 10575. In addition, the identity of the other base station is forwarded to access circuit 10573 in order that voice channel supervision control 10572 may instruct communication trunk 104 to couple mobile switching central office 2 with the other base station, such as remote base station 12.

If communication trunk 104 is able to establish continuity through remote base station 12 with mobile station MS4, mobile switching central office 2 is coupled with the tested base station, communication channel and the prior connection with remote base station 11 is returned to an idle state. Transfer information is returned from communication trunk 104, via data control circuit 1054, to access control 10573 for the purpose of enabling data and voice control circuit 1057 to notify mobile station controller 3 that mobile station MS4 is currently being served by remote base station 12. When continuity cannot be established with mobile station MS4 through remote base station 12, communication trunk 104 requests relocating data comparator 10576, via request information transmitted through data control circuit 1054 and access circuit 10573, to select another base station. Relocating data comparator 10576 determines if a connection can be established through another base station, such as cell control base station 1, and enters the identity of the base station into relocating store 10575. The identity of the base station is also sent to access circuit 10573 in order that voice channel supervision control 10572 may direct communication trunk 104, via data control circuit 1054, to couple mobile switching central office 2 through cell control base station 1 with mobile station MS4. Upon completion of testing continuity and the rearrangement of the mobile station communication path, communication trunk 104 enables data and voice trunk control circuit 1057 to notify mobile station controller 3 that mobile station MS4 is currently being served by cell control base station 1.

Figure 3:
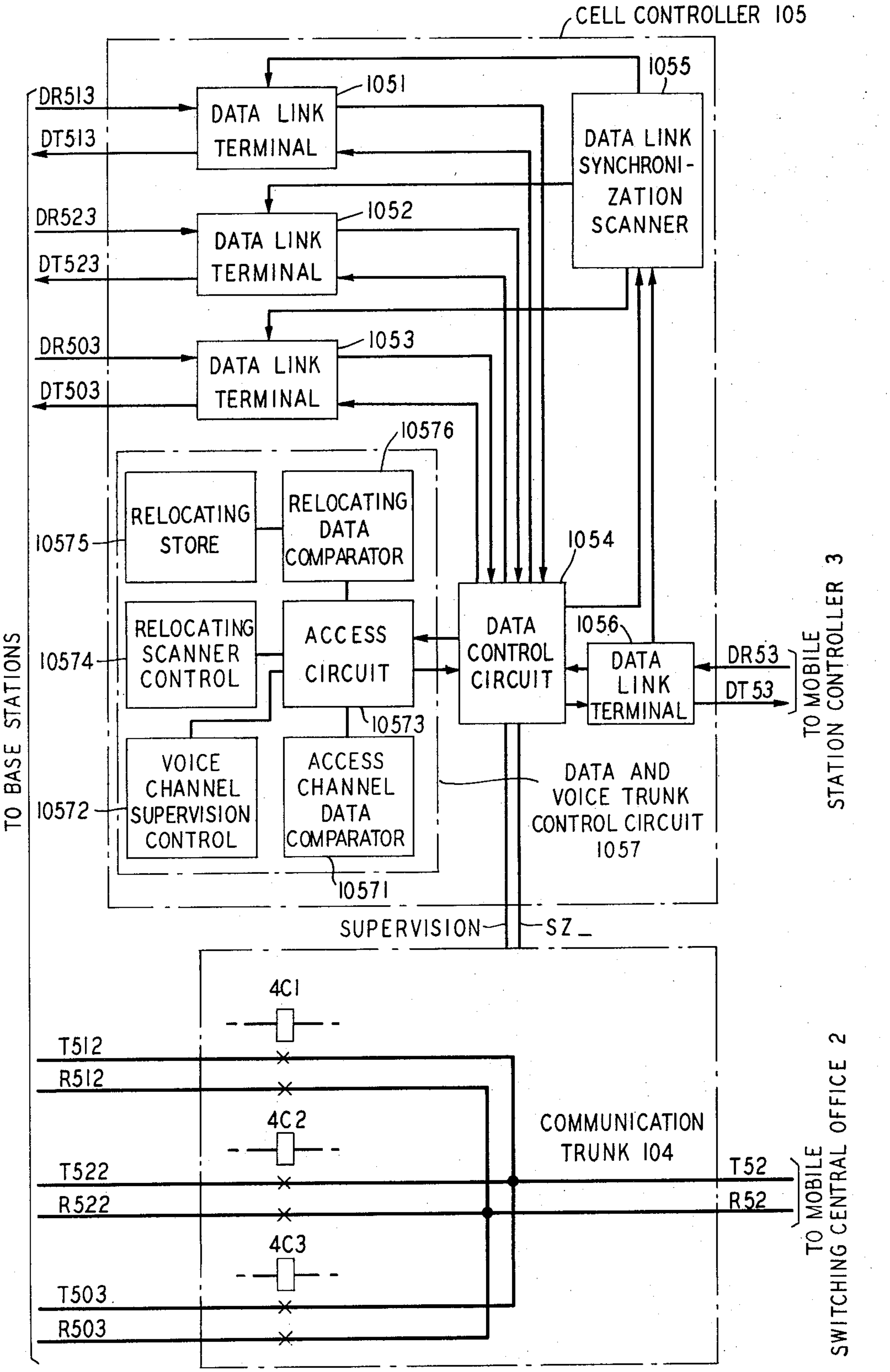
FIG. 3 depicts a cell controller data processor and a communications trunk circuit utilized to provide mobile station communication service through base stations defining a cell transmission area.

The specific details of data and voice trunk control circuit 1057 have not been disclosed herein and it will be assumed that any suitable data processing machine can be used with my invention. One example of such a data processing machine is the Digital Equipment Corporation PDP 11/20 Data Processor. While data and voice trunk control circuit 1057 is a high speed processor capable of performing many operations within a very short interval of time, it must function within the mobile communication system of FIGS. 2A and 2B along with slower operating units, such as communication trunk 104 and station controls 103, 113, and 123, on a time-shared basis. Moreover, it must quickly respond to service requests generated by these units and high speed units, such as mobile station controller 3, in order that processing of mobile station calls will not be slowed down to a degree which noticeably degrades mobile service. In order to provide this time-sharing facility, data control unit 1054, FIG. 3, is provided for buffering signals that are exchanged with data voice and control circuit 1057.

Basically, data control circuit 1054 receives high speed data information in binary form from data and voice trunk control circuit 1057, makes parity check, and forwards the information as low speed data to communication trunk 104, data link synchronization scanner 1055, and data link terminals 1051, 1052, 1053, and 1056. Low speed data received by data control circuit 1054 from base station communication trunk 104 and mobile station controller 3 is transmitted at high speed over a connecting data bus to data and voice trunk control circuit 1057.

Data link synchronization scanner 1055, under direction of instructions received from data control circuit 1054, scans data link terminals 1051, 1052, 1053, and 1056 in order that data received therein may be transmitted to data control circuit 1054 or from cell control 105 to other components of the mobile communication system. Data link terminals 1051, 1052, 1053, and 1056 are provided to convert binary data received from data control circuit 1054 into a format suitable for transmission over data links DT513, DT523, DT503, DT53 to station controls 113, 123, and 103 and cell function translator 33, respectively, set forth in FIGS. 2A and 2B. Information received over data links DR513, DR523, DR503, and DR53 is, in turn, converted to binary data and transmitted under the control of data link synchronization scanner 1055 to data control circuit 1054.

B. Originating Call

Referring now to FIGS. 4A and 4B of the drawing, arranged in accordance with FIG. 4C, it is assumed that cell controller 105 has selected remote base station 11 to serve calling mobile station MS4. It is further assumed that assignment information has been received by cell controller 105 requesting that a communication path be established by communication trunk 104 from calling mobile station MS4 through remote base station 11 to mobile switching central office 2. Data control circuit 1054 initiates the establishment sequence by transmitting control information to communication trunk 104.

The control information appearing as a ground on lead SZ1 results in the operation of relay 4SZ1. Operation of relay 4SZ1 causes the battery and ground that was initially applied through the winding of relay 4ANS1 and the break portion of transfer contacts 4SZ1-2 and 4SZ1-1 to conductors R512 and T512, respectively, to be reversed. Battery is thereby connected through the make portion of transfer contacts 4SZ1-2 with tip conductor T512 and ground, through make portion of transfer contacts 4SZ1-1, with ring conductor R512.

At this time a two-way radio carrier communication link has been established between calling mobile station MS4 and remote base station 11 via radio 111. The off-hook condition of calling mobile station MS4 results in the operation of relay 4A1 at remote base station 11 which, in turn, lowers the resistance appearing across tip conductor T512 and ring conductor R512 by placing a short through make contact 4A1-1 across a high resistance winding of relay 4S1. The current flowing in and increased by the shorting of resistance formally appearing across conductors T512 and R512 causes the operation of relay 4ANS1 located in path control 1 of communication trunk 104. Operation of supervision relay 4ANS1 provides an indication that a base station communication channel exists from communication trunk 104 over conductors T512 and R512 through serving remote base station 11 and a radio channel to mobile station MS4.

Once continuity has been established with calling mobile station MS4, communication trunk 104 initiates a sequence to couple the tested base station communication channel with conductors T52 and R52 extending to mobile switching central office 2. Supervision relay 4ANS1 provides an obvious operate path for continuity relay 4ANS through make contacts 4ANSI-1. Operation of relay 4ANS establishes a holding path for relay 4SZ1 extending from battery through the winding of relay 4SZ1, make contact 4SZ1-3, break contacts 4SZ2-1, 4SZ3-1, and make contact 4ANS-5 to ground. Seizure of communication channel 52 connected with mobile switching central office 2 is accomplished by shorting a high resistance winding of relay 4INC through make contacts 4ANS-1 to lower the resistance normally appearing across conductors T52 and R52.

Cut through of the mobile station communication path occurs upon the operation of cut-through relay 4C1 by means of an operate path extending from ground through make contacts 4ANS-3 of operated relay 4ANS, make contacts 4SZ1-6, break contacts 4C2-2, 4C3-2 and the winding of relay 4C1 to battery. Operation of relay 4C1 enables transfer contacts 4C1-1 and 4C1-2 to remove the resistor 4TR1 and capacitor 4TC1 idle line termination from across the remote base station 11, communication link 512 and to couple the tested base station communication channel with mobile switching central office 2 by connecting conductors T512 and R512 with conductors T52, R52, respectively. The low resistance appearing across conductors T52 and R52 enables recognition by mobile switching central office 2 that a call request signal has appeared on communication link 52, FIG. 2B.

A connection is established, in the manner set forth by the aforementioned Joel patent, from communication link 52 over a first network 21 path through dual access trunk 22, and a second network 21 path to digit register 24. Digit register 24, in the well-known manner, places reverse battery and ground on conductors T52 and R52, FIG. 4A, and returns a dial tone signal to calling mobile station MS4. The reversed battery and ground signals appearing on conductors T52 and R52, respectively, operate polarized relay 4INC which, in turn, enables operation of relay 4INC1 over an obvious operate path extending through make contacts 4INC-1. A ground representing a completion signal is placed on lead ON, via serial make contacts 4INC1-3 and 4ANS-4, to notify cell controller 105, FIGS. 2A and 2B, that a communication path has been established from calling mobile station MS4 through serving remote base station 11 and communication trunk 104 with mobile switching central office 2. Upon receipt of dial tone, calling mobile station MS4 forwards the called station directory number by transmitting dialing signals over the above set forth communication path to digit register 24, FIG. 2B, of mobile switching central office 2. Control 27 translates the called directory number recorded in digit receiver 24 and determines whether the call is to be completed to telephone station LL6, another mobile station, mobile operator 7, or the telephone direct distance dialing network.

C. Terminating Call

On a call terminating to mobile station MS4, the calling directory number is received by mobile switching central station 2, FIGS. 2A and 2B, and transmitted over data link 3428 to mobile station controller 3. Stored program control system 30 retransmits the called directory number, via alerting function translator 32, alerting radio 35, and antenna 36 to all mobile stations located in the geographical area served by mobile station controller 3. Upon receiving the assigned directory number, called mobile station MS4 answers by seizing the strongest two-way radio carrier data link generated by a nearby base station, such as remote base station 11. In a similar manner, as previously set forth for an originating call, called mobile station MS4 is located by cell controller 105. Subsequently, assignment information is sent to mobile switching central office 2 and cell controller 105 by mobile station controller 3 directing that a communication path be established between mobile switching central office 2 and called mobile station MS4 through communication trunk 104 and serving remote base station 11.

The incoming call to cell base station 1 appears as reverse battery and ground signals on the T52 and R52 conductors, respectively, of communication trunk 104, FIG. 4A. Polarized relay 4INC operates indicating the presence of an incoming call and provides an operate path for relay 4INC1 via make contacts 4INC-1. Data control circuit 1054 directs communication trunk 104 to extend the communication path toward called mobile station MS4 by placing a ground on lead SZ1 to operate relay 4SZ1. Relay 4SZ1 locks operated to ground through make contact 4SZ1-3, break contacts 4SZ2-1, 4SZ3-1, and make contact 4INC1-4.

The combined operation of relays 4SZ1 and 4INC1 initiates the cut-through sequence by providing an operate path for cut-through relay 4C1 through break contacts 4C3-2, 4C2-2 and make contacts 4SZ1-6, 4INC1-2 to ground. Mobile switching central office 2 is coupled with remote base station 11 by the enablement of transfer contacts 4C1-1 and 4C1-2 which remove termination resistor 4TR1 and capacitor 4TC1 from across T512 and R512 conductors connected to remote base station 11 and coupling them with conductors T52 and R52, respectively.

The reverse battery and ground signals applied through the winding of released relay 4ANS1 and operated make portion of transfer contacts 4SZ1-2 and 4SZ1-1 cause the operation of polarized relay 4S1 at remote base station 11. Operation of relay 4S1 at this time signifies the arrival of an incoming call destined for completion to called mobile station MS4. Accordingly, a signal is sent over the SUPV1 path to direct radio 111 of remote base station 11 to transmit a ringing signal over a radio carrier communication link priorly established between remote base station 11 and called mobile station MS4.

A user, located at called mobile station MS4, answers the ringing signal by going off-hook and causing the resultant operation of relay 4A1 at serving remote base station 11. The operation of relay 4A1 enables make contacts 4A1-1 to change the high resistance normally appearing across conductors T512 and R512 into a low resistance by shorting a winding of relay 4S1. Increased current resulting from the low resistance now appearing across the T512 and R512 conductors enables supervision relay 4ANS1 of communication trunk 104 to close make contacts 4ANS1-1 and operate continuity relay 4ANS. The operation of relay 4ANS enables communication trunk 104 to repeat the answer signal incoming from serving remote base station 11 by closing make contacts 4ANS-1 connected across a winding of relay 4INC and thereby decreasing the resistance across conductors T52 and R52 extending from mobile switching central office 2. Closing of make contacts 4ANS-4 in series with previously operated make contact 4INC1-3 places a ground on the ON lead connected with data control circuit 1054 to inform cell controller 105 that a communication path has been established between mobile switching central office 2 and called mobile station MS4 through communication trunk 104.

The low resistance now connected across conductors T52 and R52 informs mobile switching central office 2 that called mobile station MS4 has answered the incoming call. Accordingly, a connection is extended from the calling station through mobile switching central office 2, FIGS. 2A and 2B, to the communication path extending over communication link 52 through communication trunk 104, coupled communication link 512, and serving remote base station 11 to called mobile station MS4.

D. Intracell Handoff to Clear Base Station

During the course of conversation a mobile station may move into a part of the cell area that cannot be adequately serviced by the current serving base station. For example, mobile station MS4, FIG. 1, presently located in cell 5 and conversing over a communication path established through serving remote base station 11, may move into an area of cell 5 wherein the radio apparatus of remote base station 11 may be obscured by an obstruction, such as a hill or tall building. Upon detection of the adverse quality of communications over the mobile station communication path, cell control base station 1 maintains continuity of the communication path by rearranging the coupling of mobile switching central office 2 with another base station capable of serving the conversing mobile station.

When the match comparison performed by cell controller 105, FIG. 3, detects deterioration of the mobile station communication path, relocating data comparator 10576 selects another base station, such as remote base station 12, and instructs access circuit 10573 to place a ground, via control circuit 1054, on the SZ2 lead, FIG. 4A, of communication trunk 104. In addition, data communication circuit 1054 is further instructed to transmit hold information for remote base station 11 and assignment information for remote base station 12 over data links 513 and 523, respectively. The hold information received by serving remote base station 11 over data link 513 enables station control 113 to operate make contacts 4H-1 and provide a hold path for relay 4A1. Relay 4A1 is thereby enabled to continue operation of make contacts 4A1-1 to maintain the low resistance across conductors T512 and R512 until such time as the mobile station can be served by another base station.

It is assumed that the circuitry of control paths 2 and 3 is identical to circuitry shown in path control 1. For identification purposes, a numerical designation of apparatus comprising each path control includes the number of the path control in which the apparatus is located. Thus, relay 4ANS1 of path control 1 corresponds to relays 4ANS2 and 4ANS3, not shown, of path controls 2 and 3, respectively.

The ground appearing on lead SZ2 from data control circuit 1054 operates relay 4SZ2 which, in turn, opens break contacts 4SZ2-1 located in the hold path of previously operated relay 4SZ1. Relay 4SZ1 thereby releases and establishes a hold path for operated relay 4SZ2 through make contacts 4SZ2-3, break contacts 4SZ1-4 and 4SZ3-2 to ground appearing through parallel make contacts 4ANS-5 and 4INC1-4. At this time, the ground hold path of operated relay 4C1 is transferred by the release of relay 4SZ1 to another connection extending through make contacts 4C1-3, break contacts 4C2-1, 4C3-1, and the break portion of transfer contacts 4SZ1-6.

Following the operation of relay 4SZ2, a path, FIG. 4B, is established from ground through break contacts 5RL-1, make contacts 4SZ2-7, break contacts 4C2-7, and make contacts 4C1-8 to battery through the winding of relay 5TMST. The resultant operation of relay 5TMST opens break contacts 5TMST-1 and allows capacitor 5C to start charging through resistor 5R and time delay control circuit 1041.

The assignment information previously sent to remote base station 12 from cell control base station 1 directs the radio equipment of remote base station 12 to establish a radio carrier communication link between remote base station 12 and mobile station MS4. Assuming that a clear radio communication link can be established with off-hook mobile station MS4, remote base station 12, FIG. 4A, in the manner earlier described for an originating call, detects the transmitted off-hook condition and places a low resistance across conductors T522 and R522 extending to communication trunk 104. The low resistance appearing across conductors T522 and R522 enable the operation of supervision relay 4ANS2 included in path control 2. Operation of relay 4ANS2 provides an indication that continuity of a base station communication channel has been established from communication trunk 104 through remote base station 12 with off-hook mobile station MS4.

Once continuity has been established with conversing mobile station MS4, a ground is placed on lead SZ2A, FIG. 4B, through make contacts 5TMST-3, 4ANS2-3, and 4SZ2-10 connected with data control circuit 1054. This ground signal notifies cell controller 105 that a tested base station communication channel now exists from communication trunk 104 through remote base station 12 to conversing mobile station MS4. Rearrangement of the mobile station communication path is initiated by the enablement of supervision relay 4ANS2, FIG. 4A, which completes an operate path from ground through parallel make contacts 4ANS-3, 4INC1-2, make portion of transfer contacts 4SZ2-5, break contacts 4SZ1-7, 4SZ3-5, make contacts 4ANS2-2 to battery through the winding relay 4C2. In a manner similar to that previously described for an originating call, the operation of cut-through relay 4C2 removes the idle line termination, not shown, from across conductors T522 and R522, and connects them with conductors T52 and R52, respectively. The opening of break contacts 4C2-1 and 4C2-2 interrupt the hold path of cut-through relay 4C1 which now releases. Release of relay 4C1 enables transfer contacts 4C1-1 and 4C1-2 to place the idle line termination across conductors T512 and R512, connected with remote base station 11, and to open the connection with mobile switching central office T52 and R52 conductors.

Concurrent with the operation of relay 4C2, communication trunk 104, FIG. 4B, connects the ground appearing on the SZ2A lead through make contacts 4C2-9 with lead ANS2. Ground now appearing on lead ANS2 informs data control circuit 1054 of cell controller 105 that the coupling of mobile switching central office 2 has been rearranged with remote base station 12 in order that continuity of communications may be maintained with mobile station MS4. Cell controller 105, upon receipt of this transfer information, directs station control 113, FIG. 4A, to release relay 4A1 of remote base station 11 by opening make contacts 4H-1. Release of relay 4A1 opens make contacts 4A1-1 to insert the high resistance winding of relay 4S1 across the T512 and R512 conductors and thereby enable release of supervision relay 4ANS1 at communication trunk 104.

In addition to transmitting base station release information, cell controller 105, via data control circuit 1054, places a ground on lead RL, FIG. 4B, of communication trunk 104. Release relay 5RL operates over the obvious operate path and opens break contacts 5RL-1 for the purpose of releasing relay 5TMST. Release of relay 5TMST closes break contacts 5TMST-1 to stop charging of timing capacitor 5C and opens make contacts 5TMST-3 to remove ground from leads ANS2 and SZ2A. Thus, conductors T52 and R52 have been coupled with conductors T512 and R512, thereby continuing the existing communication path between mobile station MS4 and mobile switching central office 2 through new serving remote base station 12 without interruption of communications.

In summary, deterioration of communications over the communication path of mobile station MS4 served by shadowed remote base station 11 initiates the establishment of a base station communication channel through remote base station 12 with conversing mobile station MS4. The base station communication channel is tested by communication trunk 104 for the existence of continuity through remote base station 12 with off-hook mobile station MS4 and, upon verification of continuity, is coupled with mobile switching central office 2 to continuously maintain the mobile station communication path. The former base station communication channel is subsequently discontinued through shadowed remote base station 11.

E. Intracell Handoff to Shadowed Base Station

Digressing for a moment, it is recalled that the communication path of mobile station MS4 was previously handed off from remote base station 11, FIG. 1, to remote base station 12. However, it is conceivable that mobile station MS4 may have traveled into an area of cell 5 that is also located within a shadowed signal area of remote base station 12. Thus, the handoff of conversing mobile station MS4 to remote base station 12 would interrupt the mobile station communication path, thereby failing to maintain a continuous communication path between mobile station MS4 and mobile switching central office 2.

Referring now to FIGS. 4A and 4B of the drawing, it is recalled that data control circuit 1054 directed communication trunk 104 to initiate a handoff to remote base station 12 by operating relay 4SZ2. Operated relay 4SZ2, in combination with previously operated cut-through relay 4C1 and released cut-through relay 4C2, enables relay 5TMST which opens break contacts 5TMST-1 and allows for charging of capacitor 5C through time delay control 1041.

During the charging interval of capacitor 5C remote base station 12, in accordance with information received from data control circuit 1054, attempts the establishment of a radio carrier communication link with conversing mobile station MS4. Since shadowed remote base station 12 cannot receive the off-hook signal of mobile station MS4, the high resistance winding of relay 4S2 (not shown) remains connected across conductors T522 and R522, thereby preventing operation of supervision relay 4ANS2 included in path control 2 of communication trunk 104. The continued release of supervision relay 4ANS2 during the charging interval of capacitor 5C indicates that continuity of a base station communication channel cannot be established with mobile station MS4 through remote base station 12.

Subsequently, the charge appearing across capacitor 5C enables time delay control 1041 to operate relay 5TM through the break portion of transfer contacts 5TM-2. Relay 5TM is then held operated over a hold path extending to ground through make portion of transfer contacts 5TM-2 and break contacts 5RL-2. Operated relay 5TM places ground on lead TM, via make contacts 5TM-4, and on lead 1-2, via the combination of make contacts 5TM-3, 4C1-10, and 4SZ2-8 for the purposes of notifying data control circuit 1054 that a continuity test failed on an attempted intracell handoff of mobile station MS4 from remote base station 11 to remote base station 12.

Upon receipt of this information, cell controller 105, FIG. 2A, selects another base station, such as cell control base station 1, transmits assignment information over data link 503 to station control 103, and places a ground on the RL lead of communication trunk 104, FIG. 4B. Relay 5RL operates from ground received on the RL lead and opens break contacts 5RL-1 and 5RL-2, thereby releasing operated relays 5TMST and 5TM. Release of these two relays function respectively to recycle time delay control circuit 1041 by discharging capacitor 5C through released break contacts 5TMST-1 and removing ground from the TM and 1-2 leads by opening previously operated make contacts 5TM-4 and 5TM-3. Data control circuit 1054 receives notification of the release of timing control relays 5TMST and 5TM by removal of ground on lead RLK and proceeds to remove ground on lead RL, thereby releasing relay 5RL. At this point, cell controller 105 initiates the establishment of a base station communication channel through cell control base station 1 by placing a ground on the SZ3 lead of communication trunk 104, FIG. 4A. The resulting operation of relay 4SZ3, in addition to providing an operate path for relay 5TMST through make contacts 4C1-7, break contacts 4C3-7, make contacts 4SZ3-7, and break contacts 5RL-1, reverses battery and ground connections from path control 3 to cell control base station 1 and opens break contacts 4SZ3-2 to release operated relay 4SZ2.

Assuming that a clear base station communication channel exists between cell control base station 1 and mobile station MS4, supervision relay 4ANS3 of path control 3 detects the off-hook state of conversing mobile station MS4 and operates as a result of the low resistance placed across conductors T502 and R502. Ground placed on lead SZ3A, FIG. 4B, by the combination of make contacts 5TMST-3, 4ANS3-3, and 4SZ3-10, notifies cell controller 105 that continuity of the base station communication channel has been established between communication trunk 104 and conversing mobile station MS4 through cell control base station 1. In addition, cut-through relay 4C3, FIG. 4A, operates over a path extending from battery and the winding of the relay to ground through make contacts 4ANS3-2, break contacts 4SZ2-6, 4SZ1-8, and make portion of transfer contacts 4SZ3-6 and make contacts 4ANS-3.

In the manner priorly described for handoff to a clear base station, operation of relay 4C3 initiates the coupling of mobile switching central office 2 with cell control base station 1 for the purpose of maintaining a continuous communication path with mobile station MS4. Cell controller 105 is notified by ground appearing through make contacts 4C3-10, FIG. 4B, on lead ANS3 that rearrangement of the coupling of the mobile station communication path has occurred. A subsequent ground is placed on lead RL to operate relay 5RL and thereby begin a release of the timing apparatus of communication trunk 104.

Thus, when deterioration of the mobile station communication path occurs, communication trunk 104 is arranged to test the continuity of a new base station communication channel established with conversing mobile station MS4. In the event the off-hook state of conversing mobile station MS4 cannot be detected over the new base station communication channel, communication trunk 104 is arranged to test yet another base station communication channel. Upon detection of the mobile station off-hook state through the other base station communication channel, communication trunk 104 maintains a continuous mobile station communication path by rearranging the coupling of the other base station communication channel with mobile switching central office 2.

Summary

It is obvious from the foregoing that the facility, economy, and efficiency of mobile communication systems may be substantially enhanced by the provision of a communication trunk arranged to maintain continuity of a mobile station communication path by handing off the mobile station from a shadowed radio base station to a clear radio base station priorly identified as having established a base station communication channel with the conversing mobile station. It is further obvious from the foregoing that the aforesaid communication trunk's unique feature of testing continuity of a communication channel through a base station to a conversing mobile station, prior to coupling the communication channel with a mobile switching central office, obviates the interruption of mobile station communication paths formerly caused by handing off mobile stations to shadowed base stations.

While the equipment of my invention has been disclosed in a mobile communication switching system, it is to be understood that such an embodiment is intended to be illustrative of the principles of my invention and that numerous other arrangements may be devised by those skilled in the art without departing from the spirit and scope of my invention.

What is claimed is:

1. In a communication system having means responsive to a controller and arranged for establishing a communication path with a mobile station by selectively coupling a switching office channel with ones of a plurality of base station channels, said establishing means comprising means responsive to the controller for ascertaining transmission continuity to the mobile station through ones of the base station channels then noncoupled to the switching office channel, and means subsequently activated by said ascertaining means for maintaining continuous communications with the mobile station by rearranging the coupling of the switching office channel with one of the noncoupled base station channels ascertained to have transmission continuity.

2. In a communication system the establishing means set forth in claim 1 further comprising means for defining an interval of time during which said transmission continuity may be ascertained through one of said noncoupled base station channels with the mobile station.

3. In a communication system the establishing means set forth in claim 2 further comprising means activated by said defining means for notifying the controller of the absence of transmission continuity with the mobile station through one of said noncoupled base station channels.

4. In a communication system having means responsive to a controller and arranged for establishing a communication path with a mobile station by selectively coupling a switching office channel with ones of a plurality of base station channels, said establishing means comprising means responsive to the controller for ascertaining transmission continuity to the mobile station through ones of the base station channels then noncoupled to the switching office channel, means subsequently activated by said ascertaining means for maintaining continuous communications with the mobile station by rearranging the coupling of the switching office channel with one of the noncoupled base station channels ascertained to have said transmission continuity, and means for signaling the controller that the switching office channel has been coupled with said ascertained one of said base station channels.

5. In a communication system having trunk means responsive to a controller and arranged for establishing a communication path with a mobile station by coupling to a second channel connected to a switching office one of a plurality of first channels each connected to a separate base station, said trunk means comprising means responsive to the controller detecting adverse quality of communications of said coupled one of the first channels for testing transmission continuity through noncoupled ones of the first channels to the mobile station in a prescribed sequence defined by preferred ones of the base stations, and means activated by said testing means upon detection of said continuity for maintaining continuous communications with the mobile station by rearranging the coupling of said second channel with a tested one of said noncoupled first channels having said continuity.

6. In a communication system the trunk means set forth in claim 5 wherein said testing means comprises means enabled by the contoller for selecting said noncoupled ones of the first channels defined by said preferred base stations, and means in series with each of said first channels for detecting an off-hook signal of the mobile station received over said selected first channels while still noncoupled.

7. In a communication system the trunk means set forth in claim 6 wherein said maintaining means comprises means operated by said selecting means in combination with said detecting means subsequent to an operation of said testing means for rearranging the coupling of second second channel with a tested one of said selected noncoupled first channels having said off-hook signal.

8. In a communication system having trunk means responsive to a controller and arranged for establishing a communication path with a mobile station by coupling to a second channel connected to a switching office one of a plurality of first channels each connected to a separate base station, said trunk means comprising means responsive to the controller detecting adverse quality of communication of said coupled ones of the first channels for selecting noncoupled ones of the first channels in a prescribed sequence defined by preferred ones of the base stations, means in series with each of said first channels for detecting an off-hook signal of the mobile station received over said selected first channels, timing means for defining an interval of time during which said off-hook signal may be received over said selected first channels, means subsequently activated by said detecting means for maintaining continuous communications over the communication path by rearranging the coupling of the second channel with one of said selected first channels having said off-hook signal, and means enabled by said timing means for notifying the controller that said off-hook signal has not been received over said selected first channels established through said preferred base stations.

9. In a communication system the trunk means set forth in claim 8 wherein said maintaining means also comprises means enabled upon activation of said timing means for signaling the controller that said mobile station off-hook signal has been received over said one selected first channel.

10 In a communication system the trunk means set forth in claim 9 further comprising means for indicating an interruption in the rearrangement of the coupling of the second channel with the first channels.

11. In a cellular mobile communication system having trunk means responsive to a cell controller and arranged for establishing a communication path between a mobile station and a switching office by selectively coupling a switching office channel with one of a plurality of base station channels each terminating on separate cell base stations, said trunk means comprising means enabled by the cell controller detecting adverse quality of communications over the coupled base station channel for selecting noncoupled ones of the base station channels in a prescribed sequence defined by preferred ones of the cell base stations, means in series with each of the base station channels for testing transmission continuity through said selected noncoupled base station channels to the mobile station, means subsequently enabled by said selecting means in combination with said testing means for maintaining continuous communications with the mobile station by rearranging the coupling of the switching office channel with a tested one of said noncoupled base station channels having said continuity, means enabled by said selecting means in combination with said maintaining means for defining an interval of time during which said testing means may receive a transmission continuity signal from the mobile station over said selected base station channels, and means enabled by said timing means for signaling the cell controller of the rearrangement of coupling with said tested one of said base station channels.

12. In a cellular mobile communication system having trunk means responsive to a cell controller and arranged for establishing a communication path between a mobile station and a switching office by selectively coupling a switching office channel with one of a plurality of base station channels terminating on separate cell base stations, said trunk means comprising means enabled by the cell controller detecting adverse quality of communications over the coupled base station channel for selecting noncoupled ones of the base station channels in a prescribed sequence defined by preferred ones of the cell base stations, means in series with each of the base station channels for testing transmission continuity to the mobile station through the selected noncoupled base station channels, means activated by said selecting means for defining an interval of time during which said testing means may receive a transmission continuity signal from the mobile station over said selected base station channels, means activated by the controller upon notification of failure to receive said continuity signal over said selected base station channels within said time interval for recycling said time defining means through successive time periods corresponding to said interval of time for testing said continuity through remaining noncoupled base station channels, means subsequently activated by said testing means upon receipt of said continuity signal for maintaining continuous communications with the mobile station by rearranging the coupling of the switching office channel with a tested one of said selected base station channels, and means enabled by said timing means for signaling the cell controller of the rearrangement of coupling with said tested one of said selected base station channels.

13. In a cellular communication system the trunk means set forth in claim 12 further comprising means enabled by said testing means for repeating supervision signals between the mobile station and the switching office over the switching office channel and the base station channels.

14. Trunk apparatus arranged for establishing a continuous communication path from a first port connectable with a switching office to a plurality of second ports each connectable with a mobile station, said trunk apparatus comprising first relay means for selecting ones of the second ports connectable with the mobile station, second relay means for testing continuity of signal transmission between selected ones of the second ports and the mobile station, third relay means for maintaining continuous communications over the communication path by rearranging the coupling of the first port with one of the selected second ports priorly identified as having established said signal transmission continuity with the mobile station, and means enabled by predetermined combinations of said first, second, and third relay means for indicating a status of the signal transmission continuity occurring through the selected ones of the second ports.

15. Trunk apparatus responsive to a controller and arranged for establishing a continuous communication path between a mobile station and a telephone switching office by selectively coupling a switching office channel connected to a first port with one of a plurality of base station channels individually connected to second ports, said trunk apparatus comprising selecting relays enabled by the controller for choosing ones of the base station channels connected to the second ports, supervision relays enabled by the switching office for determining transmission continuity of the switching office channel connected with the first port, testing relays enabled by an off-hook signal received over the chosen base station channels for determining said transmission continuity of the chosen base station channels connected with the mobile station, coupling relays responsive to said selecting relays in combination with said testing relays and said supervision relays for maintaining the continuous communication path by rearranging the coupling of the first port with one of the second ports connected with one of the chosen base station channels priorly identified as having established said transmission continuity with the mobile station, timing means enabled by said selecting relays in combination with said coupling relays for defining an interval of time during which one of said testing relays may be operated by said mobile station off-hook signal, first path means enabled by said timing means for notifying the controller that said mobile station off-hook signal has been received through the second port coupled with the first port and comprising first make contacts of said testing relays in series combination with first make contacts of said selecting relays and said coupling relays, second path means enabled by said timing means for notifying the controller that said mobile station off-hook signal has not been received through second ports connected with the chosen base station channels and comprising second make contacts of said selecting relays and said coupling relays, and third path means for indicating an interruption in the continuous communication path comprising second make contacts of said testing relays in combination with first make contacts of said supervision relays.

16. The trunk apparatus set forth in claim 15 wherein said timing means comprises a timing relay designating expiration of said interval of time, a first relay operable by the controller, a second relay operated by third make contacts of enabled ones of said selecting relays connected in predetermined combination with break and third make contacts of said coupling relays, and a resistance capacitive timer enabled by operation of said second relay and recycled by operation of said first relay for controlling operation of said timing relay.

17. In a mobile telephone communication switching circuit comprising a plurality of ports each connectable to a separate communication channel extending to separate base stations equipped to communicate with mobile stations and a termination connectable to a communication channel extending to a mobile telephone switching office, the invention comprising means operable for coupling a preferred one of said ports to said termination, means subsequently responsive to a controller for testing for availability of communication continuity to a mobile station over others of said ports then noncoupled by said coupling means to said termination, and means subsequently activated by said testing means in response to detection of said availability of communication continuity over one of said other noncoupled ports for causing an operation of said coupling means to couple said one of said other noncoupled ports with said switching office termination.

18. In a mobile telephone communication switching circuit comprising a plurality of ports each connectable to a separate communication channel extending to separate base stations equipped to communicate with mobile stations and a termination connectable to a communication channel extending to a mobile telephone switching office, the invention comprising means responsive to a receipt of a signal indicating a degradation of communication with a mobile station over one of said ports then coupled to said termination for testing communication continuity through remaining noncoupled ones of said ports to said mobile station, means for controlling a sequential activation of said testing means to test communication continuity through each of the then noncoupled ports to said mobile station in a prescribed ordered sequence, means subsequently activated by said testing means in response to detection of communication continuity over a tested one of said noncoupled ports for coupling said tested port with said switching office termination.

19. The invention of claim 18 wherein said controlling means comprises means responsive to a failure to detect communication continuity over said tested port for advancing said sequence to test communication continuity on another prescribed one of said noncoupled ports, and wherein said testing means comprises means responsive to a successful continuity test of said tested port for sending a continuity notification signal to said controlling means.

20. The invention of claim 19 wherein said testing means further comprises means operable by said controlling means for seizing a preferred one of said noncoupled ports for testing communication continuity, and means responsive to an operation of said seizing means for monitoring communication continuity via said preferred one of said noncoupled ports.

21. The invention of claim 20 where said coupling means comprises means enabled by said seizing means and activated by said monitoring means for notifying said controlling means of the detection of continuity via a monitored one of said ports, means jointly activated by said seizing means and said monitoring means for rearranging a coupling of said switching office termination from a coupled one of said ports to a monitored one of said noncoupled ports having communication continuity, and means activated by said coupling means for notifying said controlling means of a rearranging of said switching office termination to said monitored port.

22. The invention of claim 21 further comprising timing means activated by said seizing means in combination with said coupling means for defining an interval of time during which continuity is tested via one of said noncoupled ports, means activated at the expiration of said defined interval for sending a notification signal to said controlling means of an absence of continuity via said monitored one of said ports, means subsequently activated by said controlling means for recycling said timing means to define a succeeding interval of time, and means responsive to the recycling of said timing means for verifying the recycling of said timing means to said controlling means.

23. The invention of claim 20 further comprising means comprising said seizing means for maintaining an operation of said seizing means, said maintaining means including means insuring seizure of only one of said ports at a time for communication continuity testing.

24. The invention of claim 21 further comprising holding means for maintaining a coupling from said switching office termination to said first-mentioned one of said ports while testing communication continuity via said noncoupled ports, said holding means comprising means comprising said seizing means and said coupling means and activated by detection of continuity to said mobile station via said monitored port for rearranging the coupling of said switching office termination from said first-mentioned port to said monitored port.

* * * * *

UNITED STATES PATENT OFFICE
CERTIFICATE OF CORRECTION

Patent No. 3,819,872 Dated June 25, 1974

Inventor(s) Harold E. Hamrick

It is certified that error appears in the above-identified patent and that said Letters Patent are hereby corrected as shown below:

Claim 1, line 40, after "have" insert --said--. Claim 7, line 43, after "of" cancel "second", first occurrence, and substitute --said--. Claim 8, line 54, change "ones" to --one--.

Signed and sealed this 29th day of October 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
* U.S. GOVERNMENT PRINTING OFFICE : 1969 O—366-334.